United States Patent
Lindenstruth et al.

(10) Patent No.: US 7,557,832 B2
(45) Date of Patent: Jul. 7, 2009

(54) METHOD AND APPARATUS FOR ELECTRONICALLY STABILIZING DIGITAL IMAGES

(76) Inventors: Volker Lindenstruth, Eichenweg 13A, 69198 Schriesheim (DE); Florent Maurice René Staley, 112 avenue du président Kennedy, 92160 Antony (FR); Ivan Kisel, Bachstr. 24, 69121 Heidelberg (DE)

( * ) Notice: Subject to any disclaimer, the term of this patent is extended or adjusted under 35 U.S.C. 154(b) by 612 days.

(21) Appl. No.: 11/202,810

(22) Filed: Aug. 12, 2005

(65) Prior Publication Data

US 2007/0035630 A1 Feb. 15, 2007

(51) Int. Cl.
*H04N 5/228* (2006.01)

(52) U.S. Cl. .............................. 348/208.99; 348/208.4; 348/294; 348/296; 348/208.14; 382/107

(58) Field of Classification Search ............ 348/208.99, 348/208.4, 294–297, 310
See application file for complete search history.

(56) References Cited

U.S. PATENT DOCUMENTS

| | | | | |
|---|---|---|---|---|
| 5,550,935 A | * | 8/1996 | Erdem et al. ................. | 382/260 |
| 6,963,361 B1 | * | 11/2005 | Kawahara et al. ...... | 348/208.99 |
| 7,061,524 B2 | * | 6/2006 | Liu et al. .................. | 348/208.4 |
| 2005/0157181 A1 | * | 7/2005 | Kawahara et al. ......... | 348/208.6 |
| 2006/0274156 A1 | * | 12/2006 | Rabbani et al. ......... | 348/208.99 |
| 2008/0030587 A1 | * | 2/2008 | Helbing .................... | 348/208.4 |

* cited by examiner

*Primary Examiner*—David L Ometz
*Assistant Examiner*—Quang V Le
(74) *Attorney, Agent, or Firm*—Barry N. Young

(57) ABSTRACT

An electronic image stabilizer in a digital camera compensates for camera motion-induced blurriness by segmenting exposure times into multiple shorter exposure times and summing the individual pixels from successive frames after applying an appropriate motion correction. Motion is detected by computing the correlation function between successive images, and compensation is applied by maximizing the correlation function. This avoids the need for mechanical stabilization devices in order to detect or correct the motion as is done in prior art. This method further enables the detection of moving objects in a still background, and correction of blurriness images due to such motion.

20 Claims, 4 Drawing Sheets

METHOD AND APPARATUS FOR ELECTRONICALLY STABILIZING DIGITAL IMAGES

This invention relates generally to digital image processing, and more particularly to electronic stabilization of digital imaging systems to compensate for motion-induced distortion and blurriness.

Digital photography, movies and digital storage media are rapidly replacing most conventional film-based photography and recording. Digital sensors in imaging systems, such as digital cameras, can be made relatively sensitive, and many of the well known sensor artifacts can be corrected sufficiently to minimize distortion in images. However, image distortion and blurriness caused by movement of the camera, e.g., jitter, or moving objects in an image scene are not presently adequately corrected. Photography with lenses having long focal lengths, which may be large, heavy and expensive and have large apertures, are particularly susceptible to image blurriness due to camera jitter motion. As a result, photography with such lenses often requires either tripods or other stable mounting platforms to stabilize the lenses, and handheld photography may be impractical. To address this, compensation approaches are known where the camera is not mounted on a tripod. The high frequency component of the natural camera motion can be compensated using mechanical stabilization, where the camera motion is detected by motion sensors and compensated to correct blurriness by appropriately adjusting the optical path, or by moving the image sensor. Lenses having such compensation features are available, but they are complex and correspondingly expensive.

Image stabilization becomes especially important when the amount of light does not suffice to provide an adequate signal-to-noise in the image sensor, thereby requiring longer exposure times that are more susceptible to motion-induced blurriness. This is true, in particular, for telephoto lenses with long focal lengths. Existing image stabilizers are based on mechanical correction for the motion, either by correcting the optical path in the lens itself, as it is done by some camera brands including Canon, Nikon and Sigma, or by moving the image sensor in the camera appropriately, as in brands such as Konika-Minolta and Panasonic. The latter approach has the advantage of being available for all lenses, while the former approach must be implemented specifically in the lens itself. However, these and other known mechanical stabilization techniques require complex mechanical devices, are expensive, and may not always adequately compensate for motion.

It is desirable to provide stabilization apparatus and methods that avoid these and other disadvantages of known stabilization approaches, and it is to these ends that the present invention is directed.

SUMMARY OF THE INVENTION

The invention affords an electronic image stabilizer that does not require any moving parts, and is applicable to all available lenses without requiring the lenses to be modified. The invention employs the principle of fast readout of the image sensor and the later electronic processing of the pictures, generating longer effective exposure times. The invention uses a sensor readout time that is short enough so that the camera motion-induced image motion on the sensor during the exposure time, which produces image distortion and blurriness, is small compared to the maximum lateral resolution of the optical and imaging system. Accordingly, no blur is induced on the image due to the camera motion during a single exposure. This is somewhat analogous to using a short exposure times during bright daylight, but the invention operates also during darker lighting conditions where longer exposure times are required.

In one aspect, the invention divides an exposure time which is appropriate for a given set of lighting conditions into multiple time intervals which are each short enough so that the camera-induced motion of the image on the sensor can be neglected. This produces a series of successive images corresponding to the multiple time intervals, which may be integrated digitally after the camera motion-induced offset between the individual image readouts has been reversed. This may be implemented by pair-wise comparison of the images, determination of a relative offset vector, and appropriately applying this offset vector in order to compensate and correct the camera motion-induced image translation prior to the integration of the images.

In another aspect, the invention may identify moving objects within a scene being imaged, and compensate for their motion using similar techniques to the motion correction of the camera itself. This is accomplished by detecting and isolating a localized area corresponding to a moving object in the scene. An offset vector is computed by pair-wise comparing the defined moving object areas of two image frames and used to compensation for the motion of the object.

More particularly, the invention takes a number of successive images with short enough exposure times to enable neglecting both the motion of the imaging system and the motion of the object itself. A processing system first determines the lateral offset between the individual images by comparing parts of each image containing still, non-moving objects, and then isolates moving objects within the image. The sequence of pictures is then superimposed by using the offset vectors for the still parts of the image, and then further offset for the moving object itself within the picture. The result is that both the still and moving parts of the object are recorded without motion blurriness.

The invention affords a number of advantages, including increased effective sensor resolution and sensor size, and increased dynamic range due to the digital summing. Color interpolation may be eliminated, as complete color frames may be generated during the integration, depending on the jitter amplitude. Moreover, motion correction is not limited to two or three aperture stops, as are the known prior art mechanical techniques.

DETAILED DESCRIPTION OF THE PREFERRED EMBODIMENTS

Figure 1:
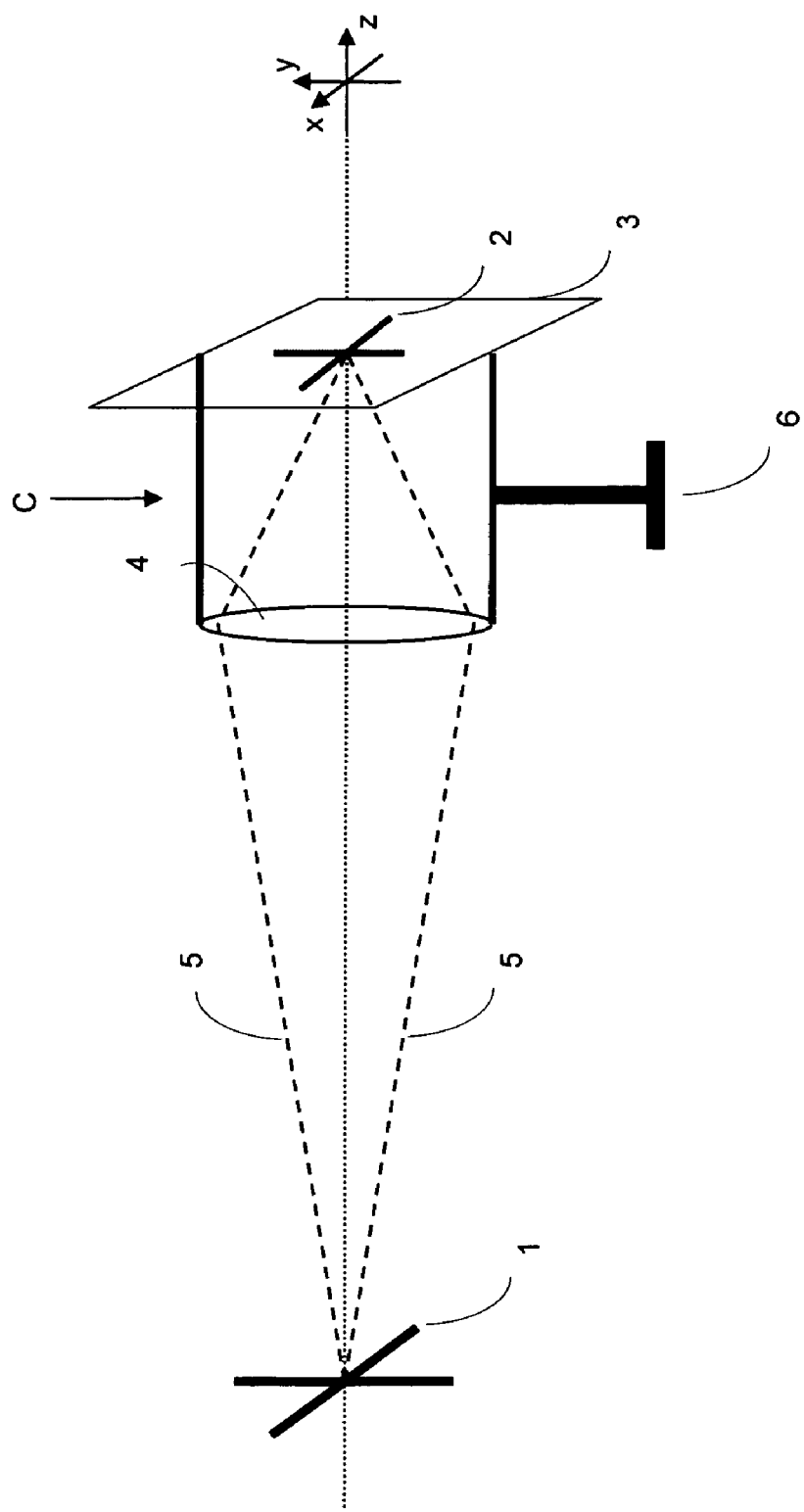
FIG. 1 depicts schematically the functional building blocks of a canonical imaging system held fixed to a specific location, for instance by using a tripod.

A generic photographic imaging system comprising a digital camera C is illustrated schematically in FIG. 1. A stationary object 1 is projected via a lens 4 of the camera onto an image sensor 3 at the focal plane of the camera. The camera with its lens is mounted on a fixed support 6 such as a tripod. Since the object 1 is assumed to be stationary and the camera is fixed and not moving, all light rays 5 leaving a particular point of the object are focused onto one point in the focal plane, as shown. This produces a sharp image 2 of the object 1 on the sensor 3.

Figure 2:
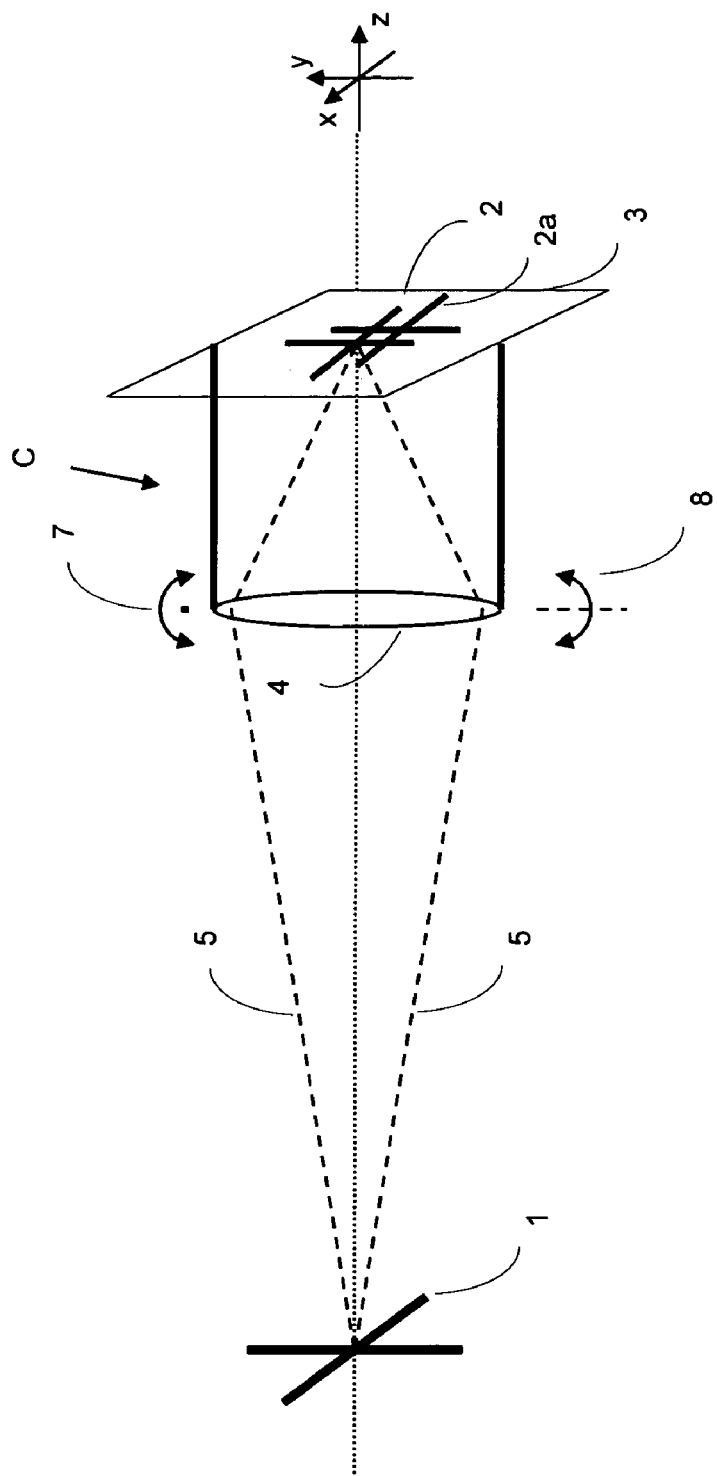
FIG. 2 is a schematic view similar to FIG. 1 of an imaging system that is not fixed showing the effects on an image of imaging system motion around a horizontal and a vertical symmetry axis, and the corresponding lateral displacement of an image in the focal plane.

If the camera cannot be held stable and in a fixed position, but rather is positioned manually, e.g. hand held, a certain amount of jitter motion will occur during the exposure time and may cause blurriness in the image. In principle, there are three translational motions and three rotational motions that are possible around the three-dimensional axes X, Y, and Z, as shown in the figure. Except for microscopy and macro pictures, which are typically taken on a fixture, translation along the Z axis may be neglected since this does not cause blurriness. All other lateral motions have to be taken into account during the exposure, and the two rotational motions 7, 8 around X axis and Y axis, respectively, as shown in FIG. 2, are the most important ones. Unlike rotations around the Z axis, which mainly affects the perimeter of the image, rotations 7, 8 around X and Y affect the entire image. Both translational and rotational motions result in a first order translation (lateral movement) of the object image, as shown at 2, 2a, on the image sensor 3, thereby blurring the image when the expose time is long enough that the motion exceeds the lateral resolution of the imaging system. The only known ways to avoid this problem are either to shorten the exposure time such that the image jitter motion during the exposure time can be neglected, which is typically possible only in very bright lighting conditions, or to implement complex optical image stabilization systems.

Figure 3:
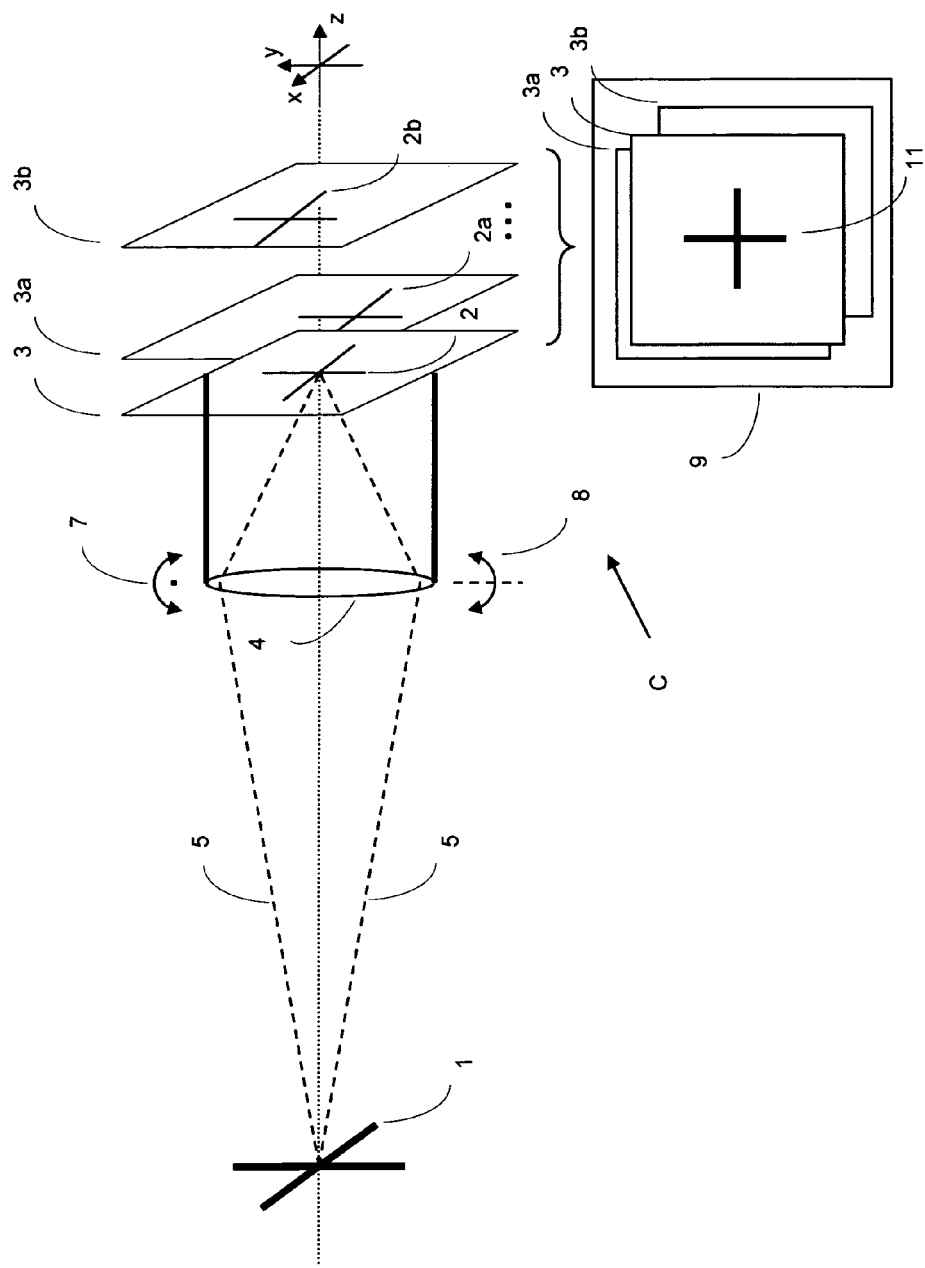
FIG. 3 depicts functionally an embodiment of an electronically stabilized moving imaging system in accordance with the invention for compensating and correcting motion-induced distortion and blurriness in images and to produce a sharp image.

FIG. 3 illustrates a preferred embodiment of the invention. An object 1 is projected via an optical system 4 comprising a digital camera C, for example, onto the image sensor 3 of the camera. The camera is not assumed to be fixed, and the optical system, including the sensor, may be moving. The movements that are the most important contributors to blurriness are rotations 7, 8 around the horizontal X axis and vertical Y axis, respectively, as previously described and as shown in FIG. 3. Such movement will induce a lateral motion and corresponding lateral translation of the image 2 on the sensor 3. This lateral translation of the image is shown as images 2, 2a and 2b, corresponding, for example, to the positions of the image of the object on the sensor at different times. This movement can cause blurriness or other distortion in the resulting picture if the movement occurs during the time the image is being exposed on the sensor. The invention electronically detects and compensates for such movement to produce a sharp image that is free of blurriness.

In accordance with the invention, a normal exposure time that is appropriate for a given set of photographic conditions may be divided into a series of multiple shorter exposure times by reading out data from the sensor at a high frame readout rate. The data read out from the sensor may be stored in buffers. This is represented in FIG. 3 as underexposed images 2, 2a . . . 2b stored in corresponding buffers 3, 3a, . . . 3b. The readout rate may be selected so that the individual images 2, 2a, 2b, . . . , corresponding to the multiple exposures may be assumed to be fixed and substantially free of motion-induced blurriness. Digital processing and integration may then be used to electronically determine and correct for the random motion that that produces lateral offset between images and would otherwise cause blurring during the longer normal exposure time, as will be described. Dividing the exposure time into multiple shorter time intervals enables the lateral offset motion during each of the shortened exposure times to be made small compared to the spatial resolution of the imaging system. Control of sensor readout and digital processing of images may be performed by control and processing software running in the processor 9 of the digital camera. The buffers may be incorporated within the processor, or separate buffers within the camera.

The sensor may be segregated into separate, independent regions that are read out in parallel in order to improve readout speed. If two successive images 2a, 2b, for example, are compared, the two images would be identical, except for digitization and sensor noise, in the absence of movement of the camera. In case of movement, some lateral offset will exist between the two images. The lateral offset may be determined by computing a lateral offset vector between the two images.

There are different ways to compute the lateral offset vector. The offset may be detected and quantified by computing the correlation function between the two successive images, which will provide an appropriate result. However, this is rather computationally intensive and is, therefore, not a preferred method for on-line processing. Another preferred approach implemented in the preferred embodiment of the invention is to use horizontal and vertical intensity histograms of the individual images. Maxima of the first derivative of these histograms identify areas of particular high contrast. The lateral offset between the corresponding peaks in the appropriate intensity histograms of the compared images give the X and Y components of the translation vector. This algorithm focuses on areas of high contrast where the lateral position resolution is highest. It is also possible to perform this computation on the brightness or the individual color intensity distributions, thereby affording a measure of error for the translation vector.

The color or brightness intensity histograms sum over a number of pixels in a given row or column of the image and, therefore, are not very sensitive to noise, which is expected to be higher than normal in the individual images since they are underexposed. The intensity histograms can be computed on-line during the digitization process, and, therefore, do not require any additional computation time. The computation of the first derivative of these histograms and finding of the peak also does not require significant hardware resources as it need only be performed in one dimension. The histogram processing for one image may be performed while the next image is being exposed on the image sensor. Implementing three image buffers with appropriate histogram memories allows the entire processing, including the merging of two consecutive images, to be fully pipelined, avoiding any processing related sensor dead time. As indicated above, the processing may be performed in the processor in the camera.

The translation offset vector can be determined with a resolution better than the pixel granularity itself by using the pixel color and amplitude information. Knowing this motion-induced translation offset makes it possible to correct for the offset when merging the individual image frames. This may be done by adding a translated second image to a first image by superimposing the images with the appropriate fractional pixel offsets such that the correlation maximizes. Where appropriate, interpolation may be applied between the individual pixels. This interpolation technique may also be used when digitized images are being resized to different resolutions.

Aside from lateral image motion, there is a typically a small amount of camera rotation around the Z axis. This can be easily determined, as will be described, using the techniques presented above by computing individual translation vectors in the corners of a frame, which allows determination of the translational and rotational movements.

Fractional offsets may also be determined using this approach of the invention, but require additional de-convolution and, therefore, use greater computing power. The digital motion correcting image accumulation approach of the invention allows full correction for any jitter motion occurring during exposure, while affording artificially large exposure times and sharp images free of blurriness.

As an example of the invention, a telephoto lens typically requires short exposure times and supports only smaller apertures. This often results in the requirement of a large exposure time of, for instance, 1 sec., unless the picture is to be taken in bright daylight. Assuming an exposure time of an individual frame of 1/300 sec., 300 individual frames have to be superimposed for a normally exposed picture. The total time for taking the picture depends on the sensor readout scheme. If the sensor supports the readout of individual rows while other rows are acquiring the optical signal, the sensor dead time is negligible. If the sensor has to be stopped prior to its digitization, which is typical for CCD sensors, the readout time adds directly to the time required to take the picture. Assuming a readout time of 1 millisecond (ms), the 1 sec. exposure time, requires 300 frames, and 1.3 sec is required for taking the integrated picture. Longer digitization times will add linearly, but will not affect the over all approach.

In the above example, the exposure time of an individual frame will be 1/300 of the final picture resulting in an appropriately lower signal to noise. However, the only requirement is that there is enough light to safely compute the offset vectors. Since the technique presented above for computing the offset vectors integrates a large number of pixels and then compares the summary histograms, this noise is cancelled out even for the individual underexposed images.

The sensor noise has two categories of components. One is random noise in the entire sensor, digitization chain, including digitization noise induced by the A-to-D converter (ADC), and the other is systematic noise such as fixed pattern noise and systematic non-linearities. The systematic component may be corrected by calibrating the sensor readout system. The random noise can be reduced by trying to achieve the highest possible signal-to-noise ratio, as by measuring and digitally integrating the same image several times. This reduces the random noise by the square root ("sqrt") of 1/N, where N is the number of measurements. If an exposure of time $T_0$ is broken up into k shorter individual exposures of the same object, the signal will decrease by a factor k and the signal-to-noise ratio will increase correspondingly. If then the k pictures were integrated digitally, the signal level would be approximately the same as it would be with the exposure time $T_0$. However, the random noise component would be reduced by sqrt (1/N). This noise reduction also includes, in particular, the digitization noise, and therefore effectively increases the effective amplitude resolution per pixel due to the multiple sampling.

One side effect of the processing is that the image will increase in size. Given the assumptions above, the lateral size of the image will increase by the lateral motion amplitude, which it may be estimated will not exceed ±10%, where the edges of the image will receive less signal-to-noise. Therefore, the digital processing will typically require a larger image buffer than the sensor itself. However, the storage of the image may, if desired, be reduced to the central core of the frame by disregarding the additional underexposed boundary pixels. The 10% edge area of the picture may also be comparably under-exposed depending on the motion amplitude because fewer frames are integrated there.

The availability of several images with random fractional pixel offsets results in an increased effective pixel resolution of the original image. Since interpolation between pixels has to be implemented already in order to allow compensation for fractional pixel offsets, no additional computation hardware is required, except for an appropriately larger pixel buffer. In addition, the invention also applies to individual color frames, resulting in a full coverage image of all individual color frames. This may eliminate the need for color interpolation, depending on the jitter amplitude.

Another benefit of the digital integration of a series of images with random, fractional pixel offsets is that Moire effects can be minimized. As a consequence, the anti-aliasing filter, typically implemented in front of all digital sensors, can be eliminated. This increases the sharpness of the images.

Another advantage of the invention is that it mitigates the effect of hot or dead non-functional pixels, since they are weighted out during the multiple image integration. The invention allows reconstruction in the signal of the non-functional pixels during the image integration process.

The digital integration of the pixel amplitudes allows sums larger than the ADC dynamic range, thereby effectively increasing the dynamic range of the sensor. For instance, a 12-bit ADC and a maximum integration of 1024 image frames results in a 22-bit dynamic range, which cannot be achieved directly by any sensor.

Another advantage of the invention is that it may use image motion to increase the effective sensor size. In this case, the camera motion is assumed to be comparably large, for instance performing a sweep over a landscape, in order to generate panoramic pictures. This feature of the invention does not use the image integration primarily for improving of the signal-to-noise, but for acquiring information, adjacent to the original frame, which increases the effective sensor size. However, in order to avoid motion-induced blurring of the individual frames, either short exposure times are required, or a large number of individual frames would have to be integrated while the camera is moved slowly over the entire scene. A user may select which part of the integrated image is to be retained, and whether part of the image is to be cropped to a predefined size.

During the image integration from the individual frames, the intensity profile of all colors may be computed to allow measurement of the overall exposure of the picture. Since this profile varies only slightly between the individual frames, the invention may compute dynamically the number of frames required for optimal image exposure. Known canonical exposure evaluation methods (such as center-weighted, etc.), which are done prior to the image exposure, are typically based on a few intensity sensors in the active area of the camera, and produce only an estimate for the exposure time. Often, they underexpose or overexpose images. The invention does not require such known exposure-measuring methods, but they may be optionally used to provide an approximate exposure time for the photographer. The invention itself may evaluate each individual pixel to determine how many frames are required for a correct exposure. If an individual frame exhibits overexposed pixels, it can be discarded dynamically and the exposure time can be reduced appropriately during the picture taking process.

The exposure time of an individual frame can be derived to a first order approximation from the focal length of the lens. The motion vector between successive frames, the exposure time and the sensor dead time induced by the readout allows determination of the motion amplitude and, therefore, the motion velocity of the camera. The motion velocity times the frame exposure time yields the image motion during the exposure of one frame, which should be significantly smaller than one pixel in order to avoid motion induced blurriness. Therefore, the invention affords dynamic determination of an optimal frame exposure time based on the actual camera motion, and advantageously even permits dynamic replacement of specifically identified bad frames by taking them again as several frames with shorter exposure time. The exposure time set by the photographer can be used in automatic mode as a maximum integration time. Also, in order to allow for full control of the picture taking process, the motion correction functionality can be switched off.

There are certain trade-offs between the number of frames to integrate, over all power consumption, exposure time, and the like. Therefore, the invention preferably enables some configuration options to be set by the user, such as limits on the exposure time, the number of frames to integrate, etc. The invention may also enable different user programs that set overall behavior of the motion correction system.

The technique of the invention may also be applied to moving objects. The difference is that the moving object may be only a portion of the overall image rather than the entire frame. Therefore, the moving object has to be first detected and isolated in the image. One possible way to implement this is with the assistance of the user. The user may identify the moving object in the image manually, for instance by pointing an identified focus point to the moving object and registering it with the camera electronics by pressing a predefined focus button. Similar techniques are presently used to define specific areas in an image scene for focusing. The electronics may then search for contours around that focus point and determine the object's boundaries using known image processing algorithms. Another more advanced and more computationally time intensive approach is to compute a contrast relief for individual images, and properly superimpose images, e.g., as shown in FIG. 3. The contrast will improve in areas of the image that are not within the boundaries of the moving objects, except for the camera motion, and it should decrease in areas that correspond to a moving object in the scene. The defined area may then serve as a first-order approximation of the moving object boundary.

In an alternative approach, the invention may divide the image frame into a matrix of regions, and compute individual motion vectors for each. The corner regions define the background motion, and the other regions define potential foreground motion. This technique will not determine the boundaries of the moving object exactly, but will to a first order compensate for its motion. In a preferred embodiment of the invention, a more exact definition of foreground and background regions may also be made by the user, like the focus point setting in current cameras.

In another specific aspect, the invention may detect image motion by computing the difference between two successive, camera motion-corrected images. This approach requires multiple processing steps. First the camera motion is corrected, for instance using corner regions of the given frame. Choosing for instance all four corners of a frame for motion vector computation enables searching for inconsistencies in the individual motion vectors. This allows detecting potential foreground motion in a given corner, which can be subsequently ignored for the background motion correction. The resulting image may be stored and subtracted from the previous frame to produce a difference frame that contains only signals above noise in areas of foreground motion. This process may be implementing using a known hit finder algorithm that suppresses noise. The resulting areas are moving foreground areas. This motion detection algorithm may be then applied individually to all identified areas of moving foreground objects in order to detect the individual object motion. The individual motion vectors can further be used for the correction of the foreground motion. However, this algorithm may be quite computationally intense, and may require multiple passes on the image data.

The invention may also use any of the known background/foreground separation techniques to separate the foreground from the background, and then compute the individual motion vectors for the background region and the different foreground regions separately.

Figure 4:
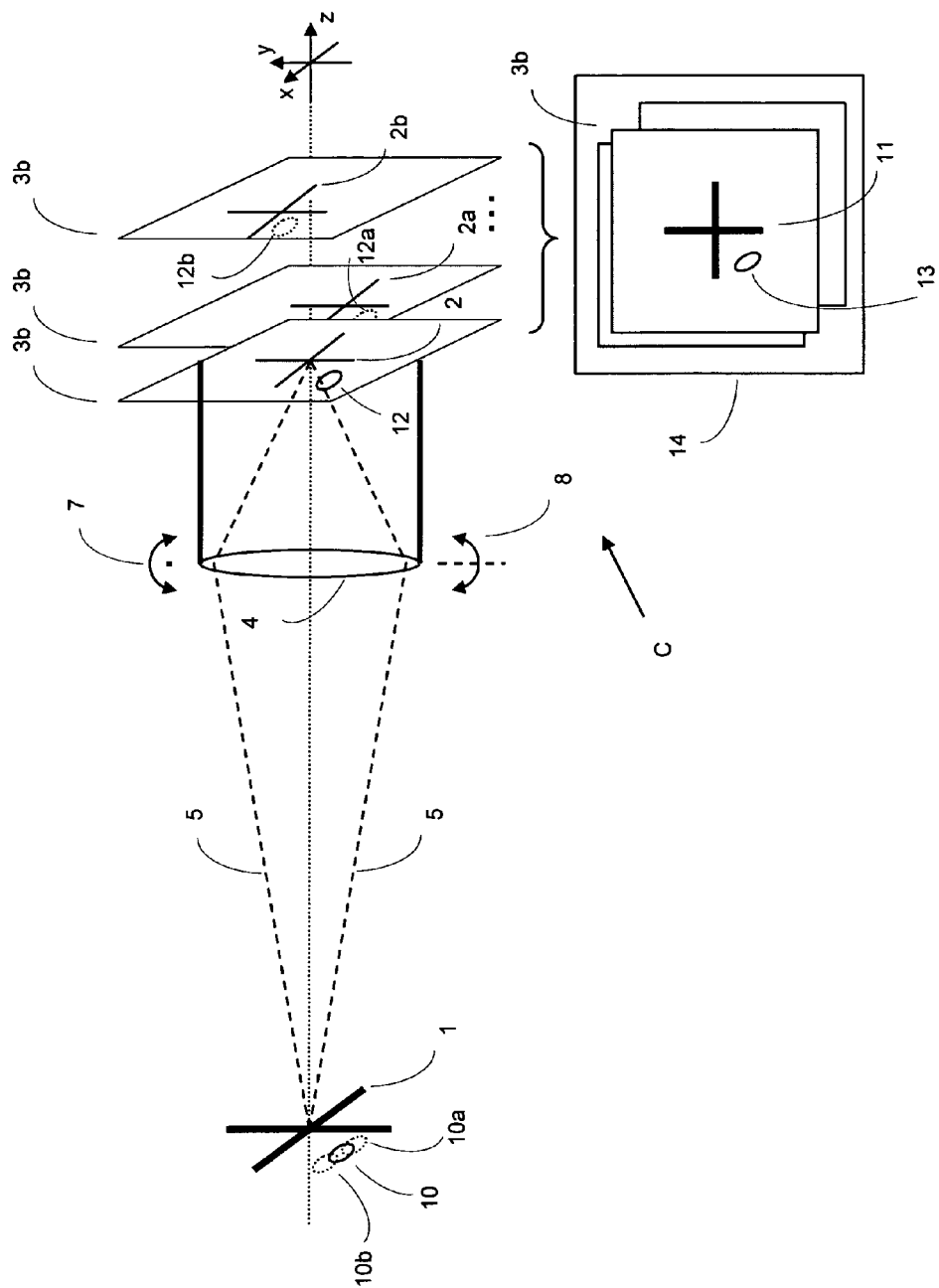
FIG. 4 depicts functionally another embodiment of an electronically stabilized moving imaging system in accordance with the invention recording a scene having both still and moving objects simultaneously, and compensating for both motion-induced blurriness as well as blurriness of the moving object.

FIG. 4 illustrates another embodiment of the invention. As described above, the image motion on the sensor due to camera movement may be compensated by taking a series of short exposure images. Also, in this embodiment, the camera processor 14 and associated image processing software may compute offset vectors between successive images in order to compensate for the camera motion. However, the invention also handles the case where there is an additional moving object 10 in the scene which will be at different locations, 10a, 10b, . . . , during the exposure. The same correction approach of the invention described above may be applied to the moving object 10 by limiting the region of the image processed by the algorithm to the appropriate region in the image. Consequently, this region should be excluded from the portion of the image processed by the camera motion correction process. The two motion vectors may be applied to each frame pair such that both the camera motion-induced movement and the moving object-induced translation of the image may be compensated, as shown at 11, 13. This results in a high signal-to-noise ratio due to a long effective integration time.

The invention may implement any of the features, discussed above, as an integral part of the camera, thereby computing on-line the integrated motion corrected image frame. The camera may also have a large memory and a fast mass storage system, allowing the storage of all of the individual frames as a large RAW data file for later processing. The image differentiation technique for isolating moving objects, as discussed above, can be applied to the stored data as a lossless data compression technique. The first image may be stored in full using known techniques, while all subsequent image frames only store differences from the previous frame. Since the expected amplitude distributions in the difference images favor small values, further lossless data compression may be applicable, for instance using entropy coders. This feature of the invention allows all or part of the described processing features to be performed off-line as part of the RAW unpack operation.

From the foregoing, it will be appreciated that the invention may also be applied to video systems. However, here the integration times may be limited more due to the required frame rate for motion pictures.

As will also be appreciated, while the foregoing has been with reference to preferred embodiments of the invention, changes may be made to these embodiments with out departing from the spirit and principles of the invention, the scope of which is defined by the appended claims.

What is claimed is:

1. A method of compensating for motion during an exposure time in a digital imaging system, comprising
dividing said exposure time into a plurality of shorter successive time intervals, each time interval selected such that image data for the time interval has negligible motion induced blurriness;

sensing image data for each of said time intervals, the image data corresponding to individual images;

determining a lateral offset between successive images; and integrating said images to compensate for said lateral offset.

2. The method of claim 1, wherein said sensing comprises sensing said image data with a sensor having an array of pixels, and said dividing comprises selecting said time intervals such that an amount an object in an image moves on said sensor during a time interval is less than a pixel resolution of said sensor.

3. The method of claim 2, wherein said dividing comprises reading data out from said sensor at a high frame rate selected to provide said short time intervals.

4. The method of claim 2, wherein said integrating comprises interpolating between pixels of the sensor.

5. The method of claim 1, wherein said determining comprises determining an offset vector corresponding to the lateral offset between two successive images, and said integrating comprises using said vector to combine said images to maximize the correlation between the images.

6. The method of claim 5, wherein said determining comprises constructing horizontal and vertical intensity histograms of successive images, identifying areas of high contrast from first derivatives of said histograms, and determining maxima in said histograms to locate said lateral offset.

7. The method of claim 1, wherein said determining comprises computing a correlation between said images, and said integrating comprises combining each individual image with a single integrated image formed from a plurality of preceding images to maximize said correlation.

8. The method of claim 6, wherein said determining comprises summing one or more of color or brightness histograms of said images over a plurality of pixels.

9. The method of claim 1, wherein said integrating comprises integrating multiple images corresponding to multiple time intervals to increase the signal-to-noise ratio in the compensated image.

10. The method of claim 1 further comprising identifying a moving object with respect to a background within said images, and said determining comprises determining another offset between the positions of the moving object in successive images, and said integrating comprises integrating said images to compensate for said other offset.

11. The method of claim 10, wherein said identifying comprises identifying an area of the images corresponding to the moving object, and said determining comprises determining said other offset between images in said area.

12. The method of claim 10, wherein said lateral offset is due to imaging system motion, and said integrating comprises producing images compensated for said system motion, and wherein said other offset due to said object motion is determined from said compensated images.

13. The method of claim 1 further comprising storing image data read out from a sensor in a buffer, processing said stored image data to determine said offset, and storing integrated data corresponding to a compensated image in the buffer.

14. An apparatus for compensating for motion during an exposure time in a digital imaging system, the apparatus comprising:

an image sensor for producing image data corresponding to a scene; and a processor for controlling the sensor to produce multiple shorter successive images during said exposure time, each of said successive images selected to correspond to a small fraction of said exposure time such that each said successive image has negligible motion induced blurriness, the processor having a control program that determines an offset between successive images due to said motion, and integrates the successive images to compensate for the offset.

15. The apparatus of claim 14, wherein the processor determines the offset between said images by comparing maxima of areas of high contrast in the images.

16. The apparatus of claim 14, wherein the processor determines maxima of high contrast areas by computing a lateral offset vector between successive images from intensity histograms of the images.

17. The apparatus of claim 14, wherein the processor determines the offset between the images by maximizing a correlation function between the images.

18. The apparatus of Claim 14, wherein the control program determines another offset between integrated successive images, said other offset corresponding to a moving object in a scene, and uses said other offset to compensate for image blurring.

19. The apparatus of claim 14 further comprising a buffer for storing image data read out from the sensor, said processor processing said image data stored in said buffer to determine said offset, and storing integrated data corresponding to a compensated image in said buffer.

20. A method of compensating for motion during an exposure time in a digital imaging system, comprising dividing said exposure time into a plurality of shorter successive time intervals, each time interval selected such that image data for the time interval has negligible motion induced blurriness;

sensing image data for each of said successive time intervals, the image data corresponding to successive images;

determining a lateral offset between the successive images by constructing two dimensional intensity histograms of said images and determining maxima in said histograms; and integrating said successive images to compensate for said lateral offset.

* * * * *